United States Patent
Cherches et al.

(10) Patent No.: US 11,681,513 B2
(45) Date of Patent: Jun. 20, 2023

(54) CONTROLLED SCOPE OF AUTHENTICATION KEY FOR SOFTWARE UPDATE

(71) Applicant: TEXAS INSTRUMENTS INCORPORATED, Dallas, TX (US)

(72) Inventors: Barak Cherches, Ramat Ha'Kovesh (IL); Eric Thierry Jean Peeters, Frisco, TX (US)

(73) Assignee: Texas Instmments Incorporated, Dallas, TX (US)

( * ) Notice: Subject to any disclaimer, the term of this patent is extended or adjusted under 35 U.S.C. 154(b) by 0 days.

(21) Appl. No.: 15/931,794

(22) Filed: May 14, 2020

(65) Prior Publication Data

US 2021/0357198 A1 Nov. 18, 2021

(51) Int. Cl.
*H04L 9/32* (2006.01)
*G06F 9/44* (2018.01)
(Continued)

(52) U.S. Cl.
CPC .............. *G06F 8/65* (2013.01); *G06F 21/572* (2013.01); *H04L 9/3247* (2013.01); *H04L 9/3268* (2013.01); *G06F 8/654* (2018.02); *G06F 8/71* (2013.01); *G06F 21/33* (2013.01); *G06F 21/50* (2013.01); *G06F 21/57* (2013.01); *G06F 21/577* (2013.01); *G06F 21/64* (2013.01); *G06F 2221/033* (2013.01); *H04L 9/3236* (2013.01); *H04L 9/3239* (2013.01)

(58) Field of Classification Search
CPC ........ G06F 8/65; G06F 21/572; G06F 21/577; G06F 21/50; G06F 21/57; G06F 21/33; G06F 2221/033; G06F 21/64; G06F 8/71; G06F 11/1433; G06F 8/654; H04L 9/3247; H04L 9/3268; H04L 9/006; H04L 9/3239; H04L 9/3236; H04L 63/0823
See application file for complete search history.

(56) References Cited

U.S. PATENT DOCUMENTS 6,223,291 B1 * 4/2001 Puhi ........................ G06F 21/10
726/28
6,976,163 B1 12/2005 Hind et al.
(Continued)

OTHER PUBLICATIONS

Myoungsu Kim et al., OTA Vulnerability on User Equipment in Cloud Services, 2018 IEEE, [Retrieved on Jan. 19, 2023], Retrieved from the internet: <URL: https://ieeexplore.ieee.org/stamp/stamp.jsp?tp=&arnumber=8696053> 4 Pages (425-428) (Year: 2018).*

(Continued)

*Primary Examiner* — Anibal Rivera
(74) *Attorney, Agent, or Firm* — Michael T. Gabrik; Frank D. Cimino

(57) ABSTRACT

Techniques for updating a client device are provided that include receiving, by a client device, a software update and a certificate associated with the software update, verifying, by the client device, the certificate associated with the software update based on a stored public key of the client device, extracting an update scope value from the certificate, comparing the update scope value against a corresponding attribute of the update, and either applying the software update based on the comparing, or rejecting the software update based on the comparing.

19 Claims, 3 Drawing Sheets

(51) Int. Cl.
    *G06F 8/65*         (2018.01)
    *G06F 21/57*       (2013.01)
    *G06F 21/64*       (2013.01)
    *G06F 21/33*       (2013.01)
    *G06F 8/654*       (2018.01)
    *G06F 21/50*       (2013.01)
    *G06F 8/71*         (2018.01)

(56) References Cited

U.S. PATENT DOCUMENTS

| | | | |
|---|---|---|---|
| 10,958,435 B2* | 3/2021 | Spanier | H04L 9/3236 |
| 2003/0196096 A1 | 10/2003 | Sutton | |
| 2008/0107269 A1 | 5/2008 | Gehrmann et al. | |
| 2008/0120610 A1* | 5/2008 | Katano | G06F 8/65 |
| | | | 717/168 |
| 2008/0178171 A1* | 7/2008 | Sueyoshi | G06F 8/65 |
| | | | 717/171 |
| 2012/0005480 A1* | 1/2012 | Batke | G06F 21/572 |
| | | | 713/175 |
| 2017/0010881 A1* | 1/2017 | Kawazu | G06F 8/65 |
| 2017/0180137 A1* | 6/2017 | Spanier | H04L 9/3239 |
| 2018/0211025 A1* | 7/2018 | Brockhaus | H04L 9/3265 |
| 2018/0285602 A1* | 10/2018 | Mersh | G06F 21/33 |
| 2019/0108009 A1* | 4/2019 | Haase | G06F 3/0673 |
| 2019/0163465 A1* | 5/2019 | Fassino | H04L 63/123 |
| 2020/0089488 A1* | 3/2020 | Yu | G06F 16/148 |
| 2020/0285752 A1* | 9/2020 | Wyatt | G06F 21/53 |
| 2021/0012445 A1* | 1/2021 | Bartfai-Walcott | |
| | | | G06Q 20/1235 |

OTHER PUBLICATIONS

International Search Report for PCT/US2021/032175 dated Aug. 5, 2021.

* cited by examiner

CONTROLLED SCOPE OF AUTHENTICATION KEY FOR SOFTWARE UPDATE

BACKGROUND

Generally, a device capable of being connected to the internet, referred to herein as a connected device, is obtained by a user with a shipped software version pre-installed on the device. In many cases, after the shipped software is released, additional changes to enhance or add features, fix bug, address security issues, etc. may be made as software updates to the shipped software. Software updates allow connected devices to adapt to an ever-changing environment by allowing the software running on the connected device to evolve with the environment rather than remaining fixed at the time of release.

Traditionally, a connected device update process includes downloading or otherwise obtaining a software update package and authenticating the software update package, such as by verifying a digital signature and certificate associated with the software update package. This digital signature or certificate is conventionally verified using a public key of the connected device vendor. However, these public keys and certificates typically have an unlimited scope and are operative unless the certificates are revoked using a relatively complex revocation mechanism. In certain cases, it is desirable to reduce or remove complexities associated with the revocation process to help minimize the amount of memory, network resources, and processing power needed to apply software updates.

SUMMARY

This disclosure relates to updating software. More particularly, but not by way of limitation, aspects of the present disclosure relate to techniques for updating software by receiving, by a client device, a software update and a certificate, verifying, by the client device, the certificate associated with the software update based on a stored public key of the client device, extracting an update scope value from the certificate, comparing the update scope value against a corresponding attribute of the update, and either applying the software update based on the comparing, or rejecting the software update based on the comparing.

Another aspect of the present disclosure relates to a non-transitory program storage device comprising instructions stored thereon to cause one or more processors to generate an update scope value, the update scope value defining an attribute for a software update, generate a digital signature protecting update scope value, generate a certificate including the digital signature and the update scope value, and transmit, to a client device, the certificate and the update scope value, wherein update scope value is configured to allow the client device to compare the update scope value against corresponding attribute of the update.

Another aspect of the present disclosure relates to a device including a memory and one or more processors operatively coupled to the memory, wherein the one or more processors are configured to execute non-transitory instructions causing the one or more processors to receive, by the device, a software update and a certificate associated with the software update, verify, by the device, the certificate associated with the software update based on a stored public key of the device, extract a set of update scope values from the certificate, compare the update scope value against a corresponding attribute of the update, and either apply the software update based on the comparing, or rejecting the software update based on the comparing.

BRIEF DESCRIPTION OF THE DRAWINGS

For a detailed description of various examples, reference will now be made to the accompanying drawings in which.

DETAILED DESCRIPTION

Public key cryptography is often used in conjunction with digital certificates and signatures. In public key cryptography, a pair of keys, a public key and a private key, are mathematically related using one way functions. The public key and private keys are related such that messages encoded using the public key can only be decoded using the private key and vice versa. Thus, a digital document (e.g., file of any kind) can be digitally signed by hashing the bits of the digital document encoding the hash using a private key, and then appending the encoded hash to the digital document along with the public key. Verification then can be performed by decoding the hash using the public key and then comparing the decoded hash against a hash of the digital document. Digital signatures may be used to verify that a particular software update is from a trusted source, such as the vendor of the connected device or system.

Certain connected devices typically only install software updates from a trusted source as verified by the digital signature. Often the connected devices include a public key associated with a vendor of the connected device. This public key or certificate may be installed on the connected device as a part of producing the connected device. When a software update is developed, the software is signed using the vendor's private key and the signature is appended to the software update package. After the connected device receives the software update package, the connected device verifies the software update by verifying the digital signature with the public key or certificate that was pre-stored on the connected device, for example, during manufacturing of the connected device. Once the public key or certificate of the software update has been verified by the device, the software update is trusted and may be applied.

Figure 1:
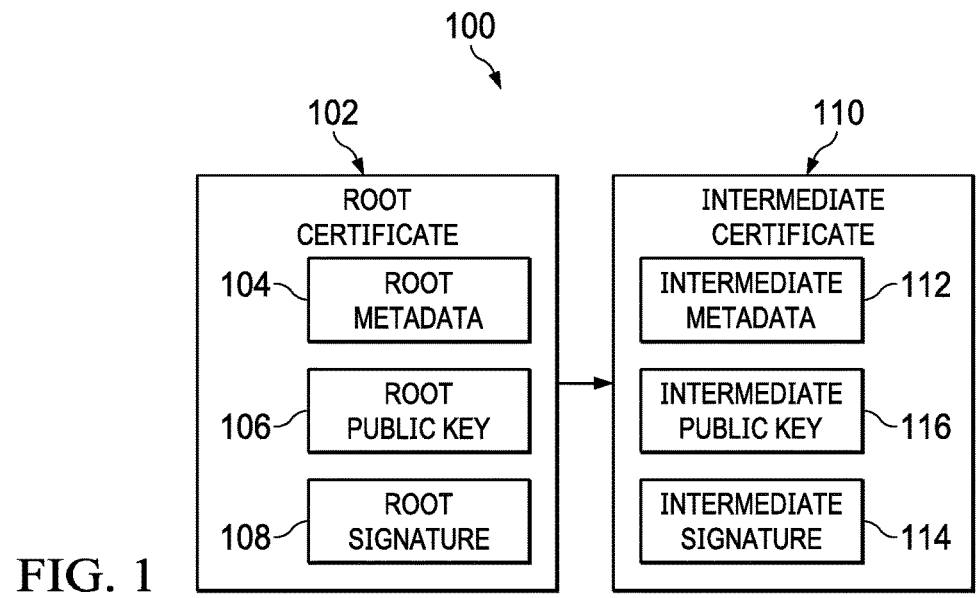
FIG. 1 is a block diagram illustrating a chain of digital certificates.

FIG. 1 is a block diagram illustrating a chain of digital certificates 100. In certain cases, a vendor of connected devices may serve as a root certificate authority for the connected devices associated with the vendor. The root certificate 102 includes root metadata 104, such as the name of the root certificate authority, identifiers, date of validity of the certificate, etc. The public key of root certificate 102 is associated with a private key of the root certificate authority. The root certificate 102 also includes a root public key 106 and a root signature 108. The root signature 108 may be computed based on root metadata and the root public key 106, using the private key of the root certificate authority, as the root certificate 102 is self-signed. When the vendor is the root certificate authority, the root public key 106 functions as a root of trust public key (ROTPK).

In cases where the vendor is the root certificate authority, the vendor may not want to use the root certificate 102 directly issue certificates to help maintain the security of the root certificate. In such cases the vendor may create one or more intermediate certificates 110 based on the root certificate 102. Here, the intermediate certificate 110 includes intermediate metadata 112, which may include metadata identifying the intermediate authority, such as to whom, or for what purpose, the intermediate certificate 110 is for. For example, the intermediate metadata 112 may indicate that the intermediate certificate 110 is a firmware authentication key (FWAK) for signing firmware updates and is issued to a particular person or team. Firmware typically refers to low level software that controls hardware of the connected device. It may be understood that while the term firmware is used, the concepts discussed herein may apply more broadly to software and devices in general. The intermediate metadata 112 may also identify the root certificate authority, for example, by including the root public key 106, or name of the root certificate authority. The intermediate metadata 112 may be hashed and signed using a private key of a root certificate authority to create an intermediate signature 114. The intermediate certificate also contains an intermediate public key 116 based on the private key of the intermediate authority.

In certain cases, a vendor may not be serving as the root certificate authority and the root certificate 102 is held by a certification authority, such as a commercial certification authority. In such cases, the vendor may request and obtain a first intermediate certificate 110 from the certification authority. The vendor may also then generate a second intermediate certificate, based on the first intermediate certificate 110, to use as a FWAK. Additional intermediate certificates may also be generated as needed. The second intermediate certificate may identify intermediate certification authority, that is the organization the first intermediate certificate was issued to, by including the first intermediate public key 116, and/or name of the first intermediate certification authority.

During the development and/or release portion of a firmware update, a digital signature may be applied to the firmware update. Creating this digital signature may require the use of a private key associated with the intermediate certificate 110 or root certificate 102. In certain cases, the security of the private key may potentially be compromised, such as through employee turnover or nefarious actions, and it may be necessary to revoke and otherwise replace the private keys. However, revocation of these keys can be difficult with connected devices as these devices may be offline or difficult to update with revocation information.

Figure 2:
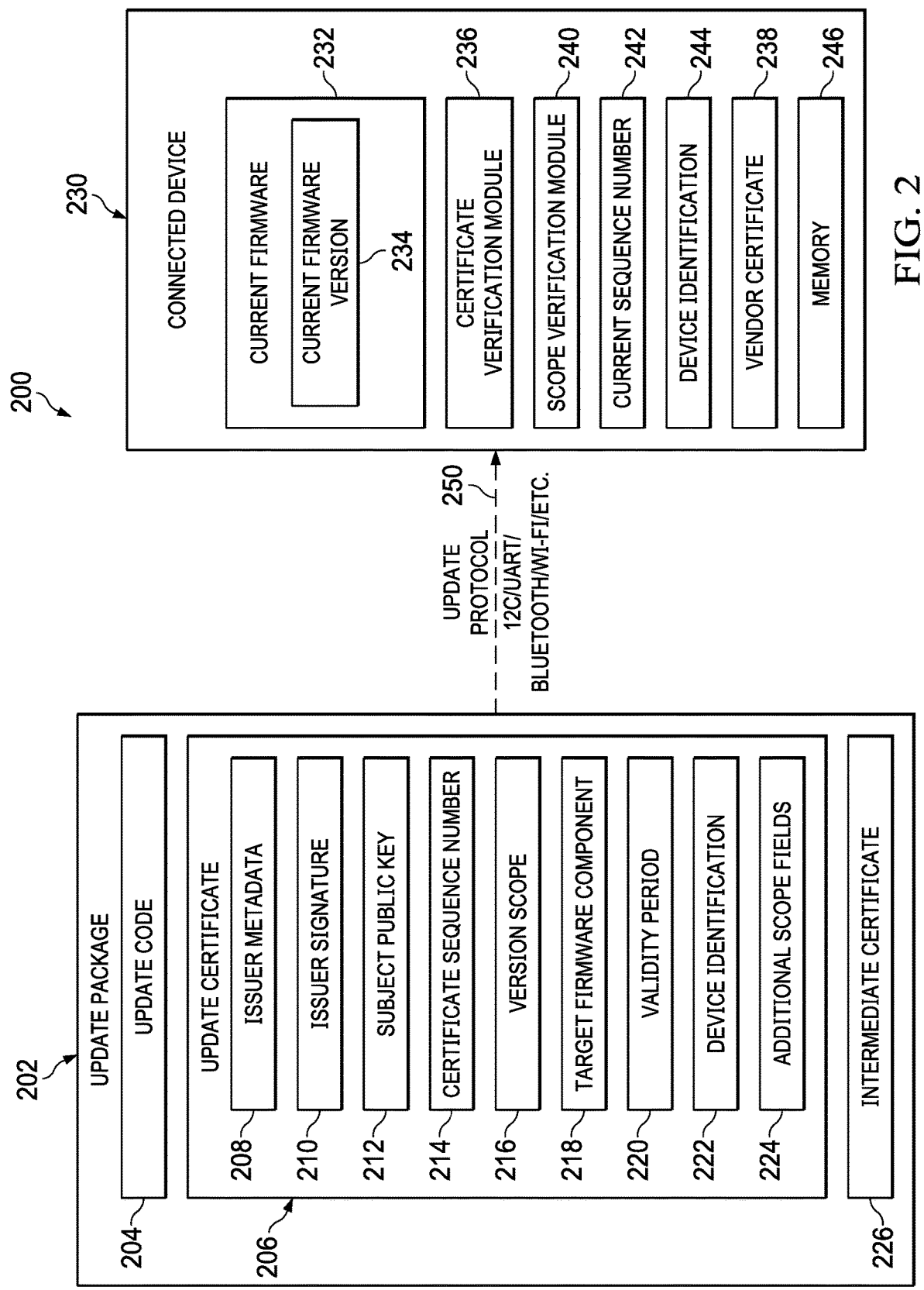
FIG. 2 is a block diagram illustrating a technique for applying a software update 200, in accordance with aspects of the present disclosure.

FIG. 2 is a block diagram illustrating a technique for applying a software update 200, in accordance with aspects of the present disclosure. In certain cases, an update package 202 includes update code 204 for updating a connected device 230 along with an update certificate 206. The update certificate 206 may be based on a chain of certificates, such as that described in conjunction with FIG. 1, along with the update code 204. For example, an organization may be acting as an intermediate certification authority and issue certificates to sub-organizations, such as a development or update team, or even individuals, such as developers. As a more detailed example, a developer may generate a public/private key pair and may submit their public key to the intermediate certification authority to request a certificate. The organization may then issue a certificate based for the developer, for example including the public key of the developer, e.g., a subject public key 212, and a digital signature of the organization, e.g., the issuer signature 210. The issuer signature 210 may be based at least in part on a hash of the subject public key 212 and subject metadata.

The update certificate 206 may also include scope fields such as a certificate sequence number 214, version scope 216, target firmware component 218, validity period 220, device id 222. The update certificate 206 may include additional scope fields 224 as desired. In certain cases, scope fields may be included as metadata, for example, in the subject metadata. For example, the issuer metadata 208 may include one or more scope fields. The scope fields define the scope of the firmware update and contain additional information identifying the scope of the firmware update. The scope fields are signed and protected by a digital signature. For example, the scope fields are contained in a portion of the certificate which is hashed and then signed by the issuer and the scope is fixed for the update certificate 206. In certain cases, a different scope, as defined by the values within the scope fields, may be set for each update certificate. For example the certificate may include a specific version of the update code 204 for which the certificate is valid against which is updated for each build of the FW. In certain cases, values for the scope fields may be based on properties of the update code, provided by the subject, or provided by the issuer.

After the update package 202 is received by the connected device 230, the firmware updated 202 may be stored in a memory of the connected device 230. A certificate verification module 236 of the connected device 230 verifies the firmware update is from a trusted source. For example, the connected device 230 includes a current firmware 232 with a current firmware version 234. After the firmware update 202 is received via an update protocol 250, the certificate verification module 236 verifies the update certificate 206 by using the issuer's public key 212 to verify the issuer signature 210. The certificate verification module 236 can access the intermediate certificate 226 from the firmware update 202 to obtain a root public key from the intermediate certificate 226. This obtained root public key is then validated against the ROTPK from the vendor certificate 238 installed during production of the connected device 230. Verifying the intermediate certificate 226 against the ROTPK allows the connected device 230 to verify that issuer is a trusted source. If the firmware update is from a trusted source, the scope of the update certificate may be verified.

The scope of the certificate defines a set of conditions that must be satisfied to apply the update. The scope of the firmware update 202, as defined by the scope fields, are enforced by the connected device 230 that receives the firmware update 202. The scope verification module 240 of the connected device 230 may verify the scope, as defined by the certificate against conditions of the update, for example based on properties of the firmware update 202, properties of the device, how the update is being applied, etc. As an example, the scope of an update may be based on a sequence number associated with the certificate. In this example, sequence numbers may only be used once and certificates may be generated with a certificate sequence number 214 which is a unique, increasing number. Thus, each time a new certificate is generated, the new certificate is provided with a different certificate sequence number which is larger than a certificate sequence number associated with a previous certificate. When the connected device 230 applies an update, the connected device 230 stores the sequence number associated with the update, in this example, as the current sequence number 242. When the next update is received, the scope verification module 240, after verifying the digital signature of the certificate as against the stored ROTPK, obtains a certificate sequence number 214 from the update certificate 206. The scope verification module 240 obtains a current sequence number 242 of the connected device 230 and compares the current sequence number 242 to the certificate sequence number 214 of the firmware update to verify that the certificate sequence number 214 as against the current sequence number 242. Where the certificate sequence number 214 exceeds the current sequence number 242, then the certificate, and associated update, may be within scope. In cases where a given certificate sequence number may be used multiple times, the connected device 230 may include a counter that is incremented each time a particular sequence number is used and compared against a limit.

As another example, the scope of an update may be based on a firmware version. In this example, the scope verification module 240 may, after the digital signature of the certificate is verified as against the stored ROTPK, obtain a version scope 216 from the scope fields of the certificate. This version scope 216, in certain cases, specifies versions, or a range of versions, against which the certificate is valid for. The scope verification module 240 may also obtain an update version of the updated code 204, as well as a current FW version 234. The scope verification module verifies that the update version is greater than the current FW version and also verifies that the update version of the update code 204 matches, or is within the range of, the version scope 216. If the update version of the update code 204 cannot be verified against the version scope 216, the update code 204 is rejected.

As another example, the scope of an update may be based on the components of the connected device 230. In certain cases, the firmware of a connected device 230 may vary, for example, based on a configuration of the connected device. Certain versions of the connected device may support different features, such as different supported networking protocols, available sensors, location specific variances, etc. These different versions of the connected device may have different firmware components based on the supported features. Information regarding the specific current firmware components 234 may be included in the current firmware 232. The scope verification module 240, as a part of checking the scope of the firmware update 202, may access a target firmware component 218 scope field and the current firmware components 234. The scope verification module 240 may compare the current firmware components 234 to determine that the target firmware component 218 matches the current firmware components 234. In certain cases, the scope verification module 240 may check that the target firmware component 218 includes at least some of the current firmware components 234.

As another example, the scope of an update may be based on a device identifier (ID) 244. In certain cases, the connected device 230 includes a device ID 224, which may be installed during production of the connected device 230. The scope verification module 240 may access a list of device IDs 222 from the firmware update 202 to verify that the device ID 244 of the connected device 230 is in the list of device IDs 222.

In certain cases, the scope of the firmware update 202 may be defined by additional properties, for example, contained in the additional scope fields 224. For example, the additional scope field 224 may indicate that the connected device 230 may be within scope if the firmware update 202 is received via a certain update protocol 250. This update protocol may define how the update was obtained, for example, the network protocol used to obtain the update or whether the update was directly copied to the device, for example via USB. The update protocol may be identified and stored in a memory 246 along with the firmware update 202. Other properties defining the scope of the firmware update 202 may also be contained, for example, in the additional scope fields 224.

Figure 3:
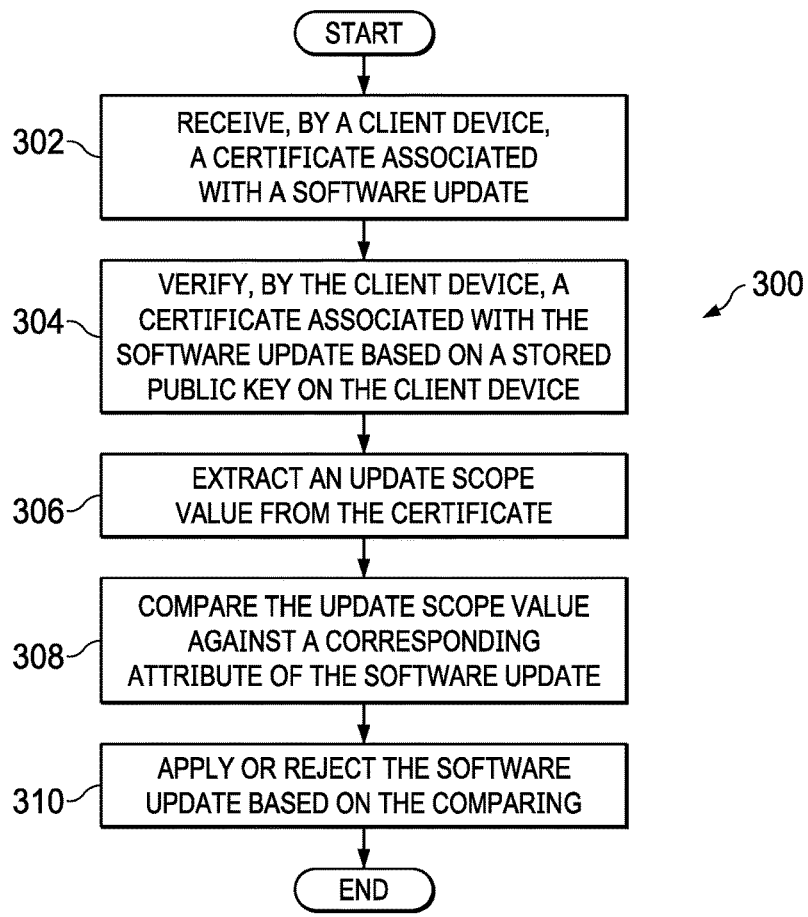
FIG. 3 illustrates a technique for updating software, in accordance with aspects of the present disclosure.

FIG. 3 illustrates a technique for updating software 300, in accordance with aspects of the present disclosure. At step 302, a client device receives a software update and a certificate associated with the software update. For example, a connected device may receive a firmware update. The firmware update may include a digital certificate along with a digital signature based on a hash of the certificate scope fields. In certain cases, the digital certificate may be received separately from the software update. At step 304, the client device verifies the certificate associated with the software update based on a stored public key on the client device. For example, the certificate may include a public key of the intermediate authority, which may be used to extract a signature, which may be decoded by a public key of the manufacturer stored on the connected device to verify that the software update originated from the manufacturer. This public key may be stored on the device, for example, when the device was manufactured. At step 306, an update scope value is extracted from the certificate. For example, one or more scope fields may be included with the update certificate. These scope fields define the scope of the firmware update. Examples of scope fields include a certificate sequence number, software version number or range, and update protocol. At step 308, the update scope value is compared against a corresponding attribute of the update. Attributes of the update may include, for example, a property of the client device, environmental values, such as a protocol or technique used to obtain an update, metadata associated with the update, relationship between the certificate and the update, etc. For example, the update sequence number may be compared to a current sequence number associated with the software already on the connected device to verify that the update sequence number is larger. Other examples include verifying that the upgrade version number is equal to or within a range of a version number in the scope field. At step 310, the software update is either applied based on the comparing or the software update is rejected based on the comparing. For example, if the comparisons succeed, the software update may be applied. In another example, if the comparison fails, such as if the software update version is outside of a range of versions defined in the certificate, then the software update is rejected.

Figure 4:
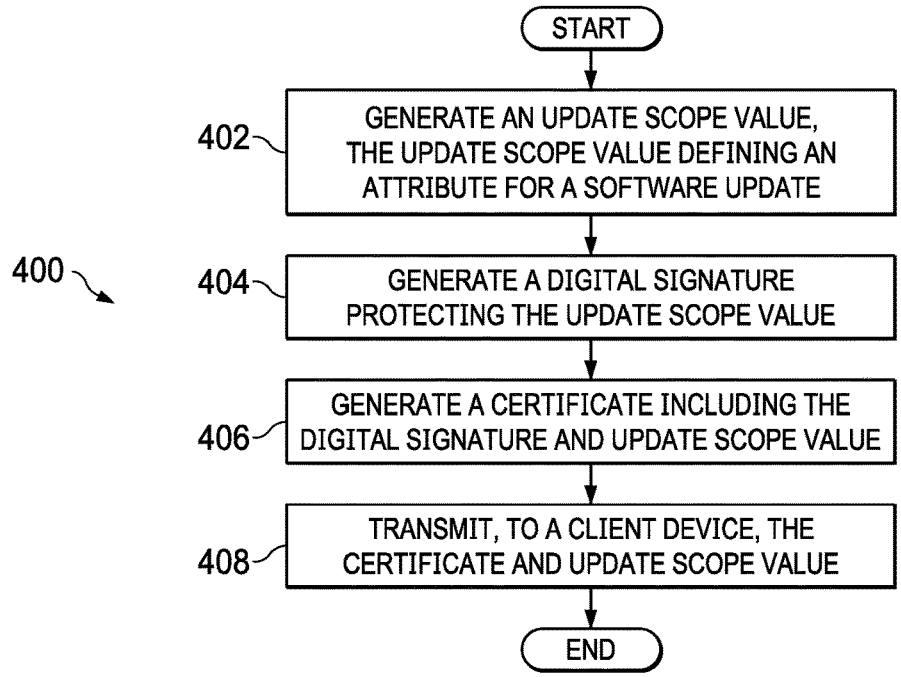
FIG. 4 illustrates a technique for updating software, in accordance with aspects of the present disclosure.

FIG. 4 illustrates a technique for updating software 400, in accordance with aspects of the present disclosure. At step 402, an update scope value is generated, the update scope value defining an attribute for an update. As discussed above, attributes of the update may include, for example, a property of the client device, environmental values, such as a protocol or technique used to obtain an update, metadata associated with the update, relationship between the certificate and the update, etc. Multiple attributes may be included in certain cases. At 404, a digital signature protecting the update scope value may be generated. For example, scope values may be included in one or more fields of a digital certificate. A digital signature may be generated based on the fields of the the digital certificate, including the scope values. The digital signature then protects the scope values. In certain cases, the digital signature may be the digital signature of the issuer of the certificate. At step 406, a certificate is generated including the digital signature and the update scope value. At step 408, a software update and the update scope value are transmitted to a connected device, wherein the update scope value is configured to allow the client device to compare the update scope value against corresponding attribute of the update.

Figure 5:
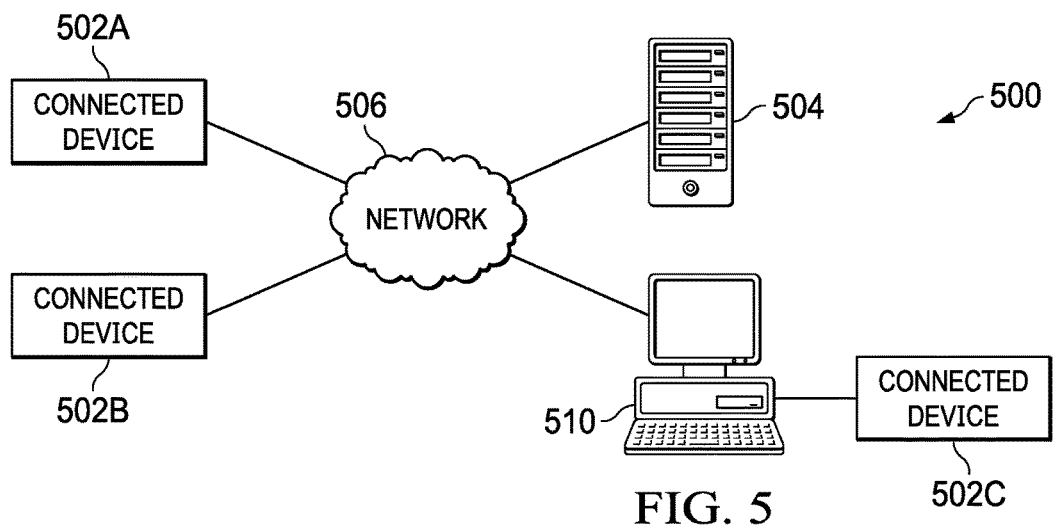
FIG. 5 is a schematic diagram of an embodiment of a computing system, in accordance with aspects of the present disclosure.

FIG. 5 is a schematic diagram of an embodiment of a computing system 500, where embodiments of the present disclosure may operate herein. Computing system 500 may include connected devices 502A-502C (collectively 502), an update server 504, and network 506, such as the internet. In some embodiments, the update server 504 may not be a single server, but one or more servers accessible via a single network address, such as a uniform resource locator (URL). In some cases, the update server 504 may be a list of alternative download sources, and may include third party servers. The URL may be utilized by an organization that distributes software updates. Although not specifically illustrated in FIG. 5, the update server 504 may also include one or more datacenters. The datacenters may include a plurality of server instances, where each server instance can be implemented on a physical computing system, such as a single electronic computing device (e.g., a single physical hardware server) or could be in the form a multi-computing device (e.g., multiple physical hardware servers). Server instances may be connected via one or more network devices (e.g., gateway or router) or a combination of devices to route or direct network traffic to an appropriate server. In certain cases, the server may also be located within a local area network (LAN).

The connected devices 502 may include, but is not limited to, an IoT device, a mobile device, such as a smartphone, tablet, etc., a personal computer, a wearable device, etc. Certain connected devices 502, such as connected device 502A and 502B are coupled to and able to communicate with the update server 504 via network 506. Certain connected devices 502C may be coupled to one or more other connected devices 502D and able to obtain updates via the one or more other connected devices 502D and network 506. The network 506 may include one or more computing networks available today, such as LANs, wide area networks (WAN), the Internet, and/or other remote networks. The network 506 may contain wired and/or wireless programmable devices that operate in the electrical and/or optical domain. For example, network 506 may include wired networks, such as ethernet, universal serial bus (USB), fiber optic connections, etc., wireless networks, such as cellular networks (e.g., Global System for Mobile Communications (GSM) based cellular network), wireless fidelity (WiFi® (WIFI is a registered trademark owned by Wi-Fi Alliance Corporation)) networks, and/or other suitable radio based network as would be appreciated by one of ordinary skill in the art upon viewing this disclosure. The network 506 may also employ any number of network communication protocols, such as Transmission Control Protocol (TCP) and Internet Protocol (IP). Although not explicitly shown in FIG. 5, network 506 may include a variety of network devices, such as servers, routers, network switches, and/or other network hardware devices configured to transport data over networks. In certain cases, the update server 504 may be directly connected to the connected device 502. For example, the update server 504 may be connected via a direct serial interface, short range radio frequency connection, parallel cable, etc.

Figure 6:
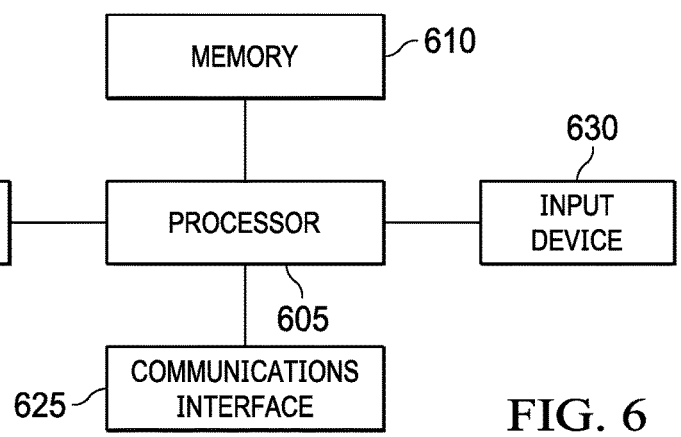
FIG. 6 is a block diagram of an embodiment of a connected device, in accordance with aspects of the present disclosure

As illustrated in FIG. 6, connected device 600 includes a processing element such as processor 605 that contains one or more hardware processors, where each hardware processor may have a single or multiple processor cores. Examples of processors include, but are not limited to a central processing unit (CPU) or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs).

FIG. 6 illustrates that memory 610 may be operatively and communicatively coupled to processor 605. Memory 610 may be a non-transitory computer readable storage medium configured to store various types of data. For example, memory 610 may include one or more volatile devices such as random access memory (RAM). Non-volatile storage devices 620 can include one or more disk drives, optical drives, solid-state drives (SSDs), tape drives, flash memory, electrically programmable read only memory (EEPROM), and/or any other type memory designed to maintain data for a duration time after a power loss or shut down operation. The non-volatile storage devices 620 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Storage 620 may be partitioned or split into multiple sections that may be accessed by different software programs. For example, storage 620 may include a section designated for specific purposes, such as storing program instructions or data for updating software of the computing device 600. In one embodiment, the software to be updated includes the ROM, or firmware, of the computing device. In certain cases, the computing device 600 may include multiple operating systems. For example, the computing device 600 may include a general-purpose operating system which is utilized for normal operations. The computing device 600 may also include another operating system, such as a bootloader, for performing specific tasks, such as upgrading and recovering the general-purpose operating system, and allowing access to the computing device 600 at a level generally not available through the general-purpose operating system. Both the general-purpose operating system and the another operating system may have access to the section of storage 620 designated for specific purposes.

Computing device 600 may also include one or more communications interfaces 625 which may be communicatively coupled to processor 605. The one or more communications interfaces may include a radio communications interface for interfacing with one or more radio communications devices. In certain cases, elements coupled to the processor may be included on hardware shared with the processor. For example, the communications interfaces 625, storage, 620, and memory 610 may be included, along with other elements such as the digital radio, in a single chip or package, such as in a system on a chip (SOC). Computing device 600 may also include an input device 630. Examples of an input device include sensors, cameras, and human input devices, such as mouse, keyboard, touchscreen, etc. Processed input may be output from the computing device 600 via the communications interfaces 625 to one or more other devices. In certain cases, the computing device 600 may also include an output device, not shown, for providing output, for example, to a user. Examples of the output device include a display screen, tactile or motion generators, speakers, lights, etc.

"The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A."

What is claimed is:

1. A method for updating a client device, comprising:
    receiving, by the client device, a software update and a certificate associated with the software update, wherein the software update includes update code;
    verifying, by the client device, the certificate associated with the software update based on a stored public key of the client device;
    obtaining a version value of the update code of the software update;
    obtaining a current version number stored on the client device;
    comparing, in a first comparison, the version value of the update code against the current version number;
    extracting a version scope value from the certificate;
    comparing, in a second comparison, the version value of the update code against the version scope value extracted from the certificate;
    accessing scope-based data from the certificate;
    accessing an identifier stored on the client device;
    verifying, in a third comparison, that the scope-based data from the certificate matches the identifier stored on the client device; and either:
        applying the software update based on the first, second, and third comparisons; or
        rejecting the software update based on the first, second, and third comparisons.

2. The method of claim 1, wherein the second comparison comprises verifying that the version value of the update code matches the version scope value.

3. The method of claim 1, wherein the version scope value comprises a range of version numbers, and wherein the second comparison comprises verifying that the version value of the update code of the software update is within the range of version numbers.

4. The method of claim 1, wherein the version scope value is protected by a digital signature of the certificate.

5. The method of claim 1, wherein the stored public key of the client device comprises a public key of a manufacturer of the client device.

6. The method of claim 1, wherein:
    the accessing of the scope-based data from the certificate includes extracting a certificate sequence number from the certificate;
    the accessing of the identifier stored on the client device includes accessing a current sequence number stored on the client device; and
    the verifying, in the third comparison, that the scope-based data from the certificate matches the identifier stored on the client device includes comparing the certificate sequence number against the current sequence number.

7. The method of claim 1, wherein:
    the accessing of the scope-based data from the certificate includes accessing a device identification list from the certificate;
    the accessing of the identifier stored on the client device includes accessing a device identification number of the client device; and
    the verifying, in the third comparison, that the scope-based data from the certificate matches the identifier stored on the client device includes verifying that the device identification number of the client device is listed in the device identification list.

8. The method of claim 1, further comprising:
    accessing a target component scope field from the certificate; and
    comparing, in a fourth comparison, the target component scope field to current components on the client device; and either:
        applying the software update based on the first, second, third, and fourth comparisons; or
        rejecting the software update based on the first, second, third, and fourth comparisons.

9. The method of claim 1, further comprising verifying a digital signature of the software update based on the certificate.

10. A device, comprising:
    a memory configured to store a current version number and an identifier; and
    one or more processors operatively coupled to the memory, wherein the one or more processors are configured to execute non-transitory instructions causing the one or more processors to:
        receive a software update and a certificate associated with the software update, wherein the software update includes update code;
        verify the certificate associated with the software update based on a stored public key of the device;
        obtain a version value of the update code of the software update;
        compare, in a first comparison, the version value of the update code against the current version number;

extract a version scope value from the certificate;
compare, in a second comparison, the version value of the update code against the version scope value extracted from the certificate;
access scope-based data from the certificate;
verify, in a third comparison, that the scope-based data from the certificate matches the identifier in the memory; and either:
apply the software update based on the first, second, and third comparisons; or
reject the software update based on the first, second, and third comparisons.

11. The device of claim 10, wherein the second comparison comprises verifying that the version value of the update code matches the version scope value.

12. The device of claim 10, wherein the version scope value comprises a range of version numbers, and wherein the second comparison comprises verifying that the version value of the update code of the software update is within the range of version numbers.

13. The device of claim 10, wherein the version scope value is protected by a digital signature of the certificate.

14. The device of claim 10, wherein the stored public key of the device comprises a public key of a manufacturer of the device.

15. The device of claim 10, wherein:
the identifier in memory is a current sequence number,
the access of the scope-based data from the certificate includes an operation to extract a certificate sequence number from the certificate; and
the verify, in the third comparison, that the scope-based data from the certificate matches the identifier stored in the memory includes an operation to compare the certificate sequence number against the current sequence number.

16. The device of claim 10, wherein:
the identifier in memory is a device identification number;
the access of the scope-based data from the certificate includes an operation to access a device identification list from the certificate; and
the verify, in the third comparison, that the scope-based data from the certificate matches the identifier stored in memory includes an operation to verify that the device identification number of the device is listed in the device identification list.

17. The device of claim 10, wherein the non-transitory instructions are configured to be executable by the one or more processors for further causing the one or more processors to verify a digital signature of the software update based on the certificate.

18. A device, comprising:
a memory configured to store a current version number, a current sequence number, and a device identification number; and
one or more processors operatively coupled to the memory, wherein the one or more processors are configured to execute non-transitory instructions causing the one or more processors to:
receive a software update and a certificate associated with the software update, wherein the software update includes update code;
verify the certificate associated with the software update based on a stored public key of the device;
obtain a version value of the update code of the software update;
compare, in a first comparison, the version value of the update code against the current version number;
extract a version scope value from the certificate;
compare, in a second comparison, the version value of the update code against the version scope value extracted from the certificate;
extract a certificate sequence number from the certificate;
compare, in a third comparison, the certificate sequence number against the current sequence number;
access a device identification list from the certificate;
verify, in a fourth comparison, that the device identification number is listed in the device identification list; and either:
apply the software update based on the first, second, third, and fourth comparisons; or
rejecting the software update based on the first, second, third, and fourth comparisons.

19. The device of claim 18, further comprising current firmware components, wherein the non-transitory instructions are configured to be executable by the one or more processors for further causing the one or more processors to:
access a target component scope field from the certificate; and
compare, in a fifth comparison, the target component scope field to the current firmware components; and either:
apply the software update based on the first, second, third, fourth, and fifth comparisons; or
reject the software update based on the first, second, third, fourth, and fifth comparisons.

* * * * *